Dec. 23, 1969    T. V. JONES    3,485,320
PORTABLE DEER STAND
Filed June 14, 1968    2 Sheets-Sheet 1
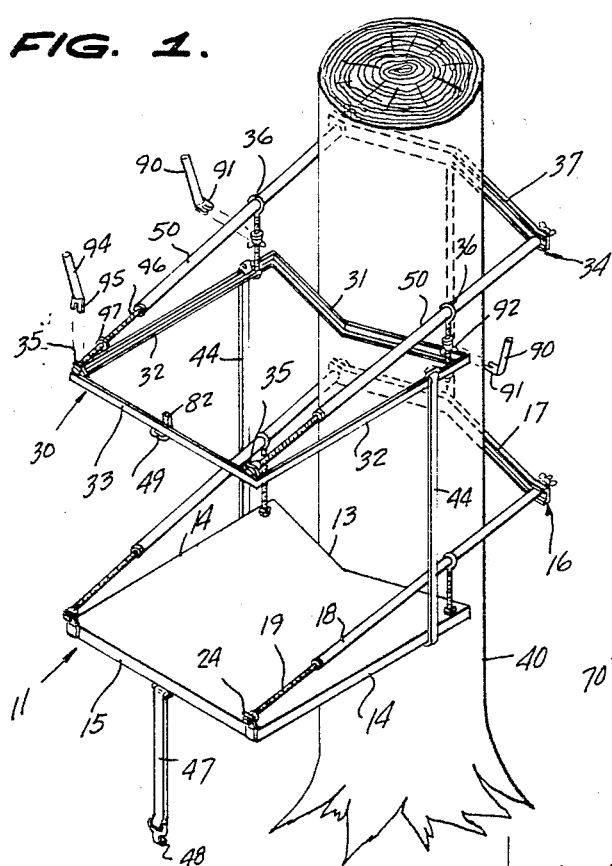
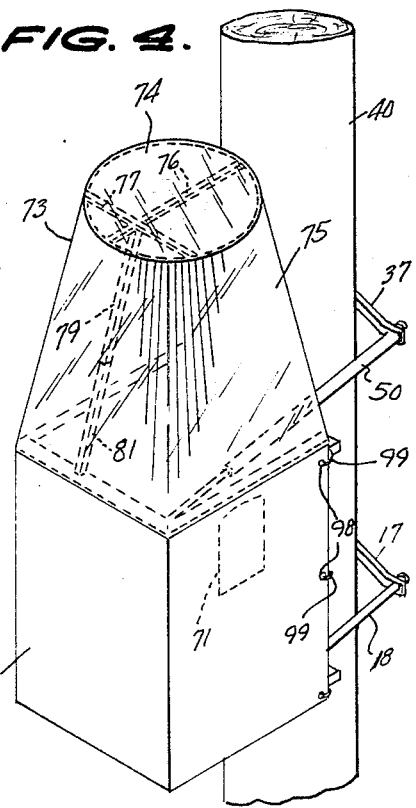
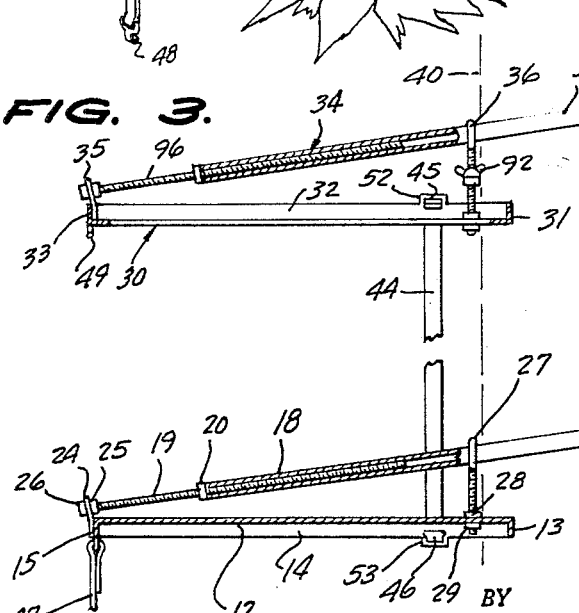
INVENTOR.
T. V. JONES,
BY Berman, Davidson & Berman
ATTORNEYS.

Dec. 23, 1969    T. V. JONES    3,485,320
PORTABLE DEER STAND
Filed June 14, 1968    2 Sheets-Sheet 2
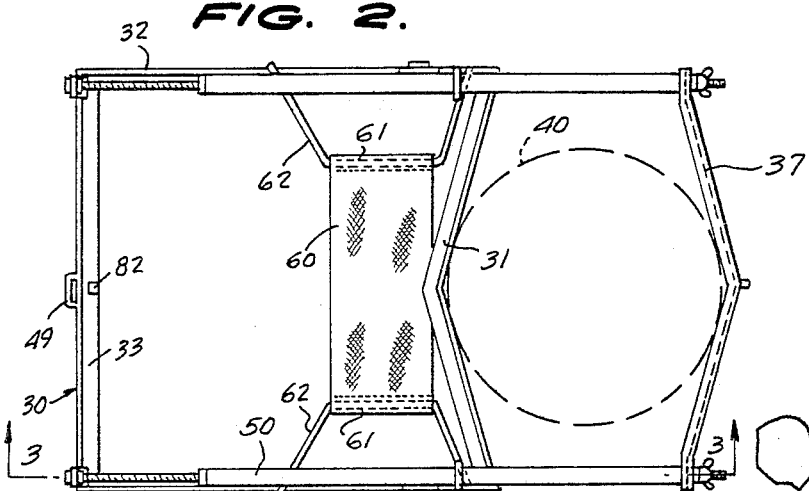
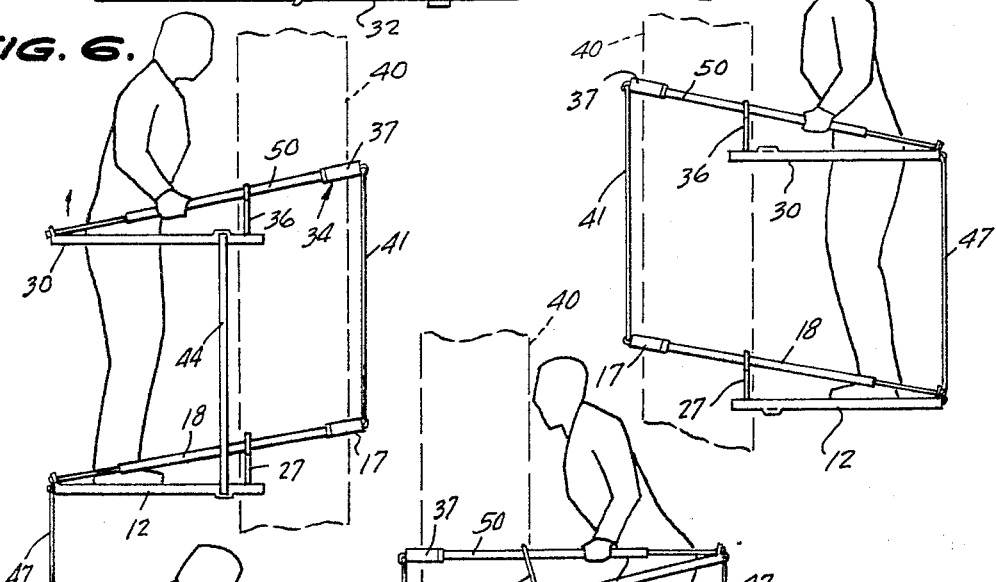
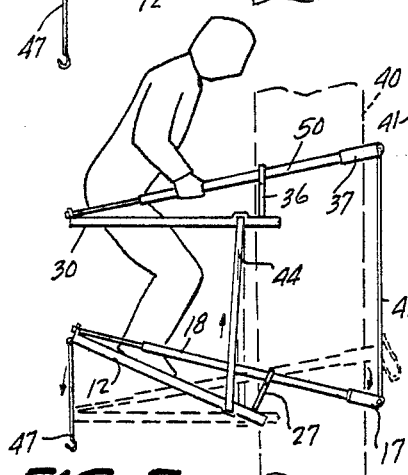
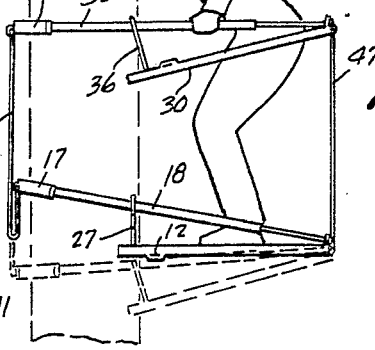
INVENTOR.
T. V. JONES,
BY
Berman, Davidson & Berman,
ATTORNEYS.

United States Patent Office 3,485,320
Patented Dec. 23, 1969

3,485,320
PORTABLE DEER STAND
T. V. Jones, 6324 S. Lake Shore Drive,
Shreveport, La. 71109
Filed June 14, 1968, Ser. No. 737,068
Int. Cl. E04g 3/00; A63b 27/00
U.S. Cl. 182—129
10 Claims

ABSTRACT OF THE DISCLOSURE

A device for climbing a vertical object, such as a tree, to provide an elevated platform for a hunter, or any other person. The device consists of a platform and a frame above the platform, each being provided with an angled clamping yoke, the trunk of a tree or other vertical object being clampingly-engageable between the clamping yokes and the adjacent portions of the platform and frame. The bight portions of the yokes are connected by a nonelastic flexible strap to limit the vertical separation of the bight portions. Elastic straps are provided near the forward ends of the sides of the platform and frame, being connected therebetween when the device is to be used for climbing a tree, or other vertical object. These side elastic straps are disconnected when the device is to be used for descending. Another elastic strap is provided at the outer edge of the platform and is adapted to be connected to the outer portion of the frame when the device is to be used for descending. When the device is arranged for climbing, by alternating his weight between the upper yoke and the platform, a person can cause the device to climb up the tree, or other vertical object embraced thereby. By detaching the side elastic straps and by connecting the outward elastic strap, the device can be similarly operated to descend the tree, or other vertical object.

---

This invention relates to tree-climbing devices, and more particularly to a device for climbing a tree, or similar vertical object to provide a platform for a hunter, or other person.

A main object of the invention is to provide a novel and improved climbing device which is relatively simple in construction, which is easy to use, which is reliable in operation, and which provides a comfortable platform while elevated.

A further object of the invention is to provide an improved device for climbing a tree, or a similar vertical object, the device involving relatively few parts, being durable in construction, being easy to assemble, and including removable shelter elements so that it can be used as an elevated shelter for a hunter, or other person.

A still further object of the invention is to provide an improved device for climbing a tree, or similar vertical object, and for supporting a hunter, construction worker, or other person in an elevated position, the device being safe to use, being relatively compact in size, being light in weight, and being provided with removable covers which may be employed under unfavorable weather conditions.

Further objects and advantages of the invention will become apparent from the following description and claims, and from the accompanying drawings, wherein:

FIGURE 1 is a perspective view showing a device according to the present invention operatively-engaged around a tree trunk, preparatory to being actuated for climbing the tree trunk.

FIGURE 2 is an enlarged top plan view of the device of FIGURE 1, shown equipped with a seat.

FIGURE 3 is a vertical cross-sectional view, taken substantially on the line 3—3 of FIGURE 2, but with the seat removed.

FIGURE 4 is a perspective view showing a device such as that illustrated in FIGURES 1, 2 and 3, but provided with protective cover members to form an enclosed shelter.

FIGURE 5 is a vertical cross-sectional view taken through portions of the framing employed with the top shelter member of FIGURE 4.

FIGURE 6 is a side elevational view diagrammatically illustrating the positions of the parts of the device of FIGURE 1 at the beginning of a climbing step.

FIGURE 7 is a view similar to FIGURE 6, but showing the manner in which the operator shifts his weight to the top yoke member at the second stage of the climbing step.

FIGURE 8 is a view similar to FIGURE 6, showing the positions of the parts of the device of FIGURE 1 at the beginning of a descent step.

FIGURE 9 is a side elevational diagrammatic view, similar to FIGURE 8, showing the positions of the parts as the operator shifts his weight to the upper yoke of the device during the second part of a descent step.

Referring to the drawings, 11 generally designates an improved climbing device constructed in accordance with the present invention. The device 11 comprises a platform 12 which is of generally rectangular shape and which is provided with the generally V-shaped front edge 13, the straight parallel side edges 14, 14, and the straight transverse outer edge 15. As shown in FIGURE 3, the edges comprise downwardly-extending flanges, serving to strengthen and rigidify the platform 12.

Designated generally at 16 is a clamping yoke comprising a generally V-shaped rigid bight member 17, which may be formed of channel-shaped stock. The generally V-shaped bight member is arranged with its channel flanges directed rearwardly, and the ends of the member 17 are adjustably-connected to the outer corner portions of platform 12 by tie bar assemblies comprising internally-threaded sleeves 18 receiving threaded rods 19 threadedly-engaged in the sleeves and locked by lock nuts 20. The forward ends of the sleeves 18 are secured to the ends of the channel-shaped bight member 17 by studs 22 threadedly-engaged in the sleeves and engaged through apertures provided in the ends of bight member 17, wing nuts 23 being engaged on the studs, as shown in FIGURE 3. The ends of the threaded rods 19 are secured to upstanding apertured lugs 24 provided on the outer corners of the platform 12, as by opposed clamping nuts 25 and 26, as shown in FIGURE 3. The sleeves 18 are supportingly-engaged through the eye portions of upstanding eye bolts 27 secured in the forward corner portions of the platform 12, the eye bolts being provided with opposed clamping nuts 28 and 29 so that the frame 16 may be rigidly-secured in an adjusted angular position with respect to the platform 12. For example, in a position spaced at the proper angle relative to platform 12 to clampingly-engage around the trunk of a tree 40 shown in FIGURE 1, the angle being of the correct value to allow the device to be manipulated in a manner presently to be described.

Designated generally at 30 is a frame similar in shape to platform 12 and spaced thereabove, the frame 30 having the generally V-shaped front member 31, the straight parallel side members 32, 32 and the straight transverse outer member 33. A clamping yoke, shown generally at 34, similar in construction to the clamping yoke 16 is connected to upstanding lugs 35, 35 provided at the outer corners of frame 30 and is supportingly-engaged through the top eye elements of upstanding eye bolts 36, 36 secured to the forward end portions of the side arms 32, 32. The frame 34 is provided with the generally V-shaped bight member 37 of channel bar stock, similar to the bight member 17 of the lower frame 16.

It will be seen that the respective pairs of eye bolts 27, 27 and 36, 36 support the respective yokes 16 and 34 in fixed angular relationship relative to platform 14 and upper frame 30, respectively. The bight members 17 and 37 are spaced forwardly by sufficient distances to cooperate with the V-shaped inner edge 13 and the V-shaped inner arm 31 to receive the tree trunk 40, or other vertical object and to exert clamping action thereon responsive to the downward pivoting of their associated weight-receiving members, namely, the platform 12 and the top frame 30.

A flexible strap member 41 of leather, webbing, or any other suitable material is employed to limit the downward separation of platform 12 relative to the upper frame 30. The flexible strap member 41 is connected by a hook 42 at its top end to the intermediate portion of the bight member 37 and is connected at its bottom end by a hook 43 to the intermediate portion of bight member 17. The strap member 41 is of a material which is flexible, but non-elastic.

Designated at 44, 44 are a pair of flexible elastic strap members, such as rubber straps, provided with suitable hook members 45 and 46 at their top and bottom ends, adapted to be detachably-secured to the opposite sides of platform 12 at their inner portions and to the opposite side arms 32, 32 of upper frame 30, likewise at their inner end portions, as shown in FIGURE 1. With the elastic strap members 44, 44 thus secured to the inner corner portions of platform 12 and frame 30, the platform 12 is biased upwardly at its inner end portion, relative to the inner end portion of upper frame 30.

Secured to the intermediate portion of the outer flange 15 of platform 12 is another elastic strap member 47 provided at its free end with a hook member 48 adapted to be, at times, detachably-connected to a slotted bracket 49 provided on the intermediate portion of the outer transverse arm 33 of top frame 30. When the elastic strap member 47 is thus connected to bracket 49 and the elastic side strap members 44, 44 are disconnected, the outer end portion of platform 12 is biased upwardly toward the outer arm 33 of top frame 30.

FIGURES 6 and 7 illustrate the manner in which the device 11 is employed to ascend a vertical object, such as the tree trunk 40. The device is first engaged with the tree in the manner illustrated in FIGURE 1, namely, with the tree trunk received between bight member 37 and the V-shaped member 31 and bight member 17 and the V-shaped platform edge 13, with the elastic strap members 44, 44 connected at the inner corner portions of the device, as illustrated in FIGURE 6. The operator stands on the platform 12 and grasps the respective sleeve members, shown at 50, 50, associated with the top yoke member 34 and elevates the top yoke member 34 against the tension of the elastic strap members 44. This stretches said elastic strap members. The operator then shifts his weight to the sleeve members 50, as shown in FIGURE 7, allowing the elastic strap members 44 to retract, thereby lifting the platform 12, while causing the platform 12 to be angled in a generally clockwise direction, as viewed in FIGURE 7, to cause it to release its clamping action on tree trunk 40. Thus, the strap members 44 elevate the platform 12 while the operator's weight is being supported on the upper assembly comprising frame 30 and yoke member 34. The operator then transfers his weight to the platform 12, whereby yoke member 17 and the inner edge 13 of the platform resume clamping action on the tree trunk, allowing the operator to be supported on the platform 12. Under these conditions, the upper portion of the assembly comprising frame 30 and yoke member 34 can be lifted by the operator through a substantial step, since said upper assembly can be pivoted in a clockwise direction, as viewed in FIGURE 7, and elevated against the stretching force of the elastic strap members 44, 44. After said upper assembly has been thus elevated, it is allowed to pivot in a counterclockwise direction as viewed in FIGURE 7, to resume its clamping action on the tree trunk, with the elastic strap members 44 under tension, after which the operator again shifts his weight to the upper assembly, as above-described, allowing the platform 12 to be again elevated by the retraction of the elastic strap members, in the manner already described, and illustrated in FIGURE 7. This cycle of operation can be repeated until the platform 12 has been elevated to the desired height on the tree trunk 40, or other vertical object with which the device is employed.

When it is desired to descend, the side strap members 44 are detached and the outer elastic strap member 47 is connected to the upper assembly by engaging the hook 48 in the slotted bracket 49. Thus, the top and bottom hooks 45 and 46 are disengaged from the slotted brackets 52 and 53 provided therefor, respectively, on side bars 32 and the side flanges 14. The operator then elevates the upper portion of the assembly by exerting upward force on the sleeve members 50 while his weight is supported on the platform 12, thereby pivoting the upper yoke member 34 in a counterclockwise direction, as viewed in FIGURE 8, which disengages the clamping bight element 31 from the tree trunk and allows the upper yoke member 34 to be lowered, for example, from the position of FIGURE 8 to the position of FIGURE 9. Thereafter, the operator shifts his weight to the pair of sleeve members 50, 50, allowing the elastic strap member 41 to retract, which rotates the lower assembly comprising platform 14 and yoke member 16 in a counterclockwise direction, as viewed in FIGURE 8, causing it to release the tree trunk and to descend from the full-line position of FIGURE 9, to the dotted-line position thereof. The operator again returns his weight to the platform 12, whereby the bottom yoke member 16 clampingly-engages the tree trunk so that the operator can be again supported on platform 12. The operator then again elevates the upper yoke 34, as above-described, by grasping the sleeve members 50 and exerting upward force thereon, to again release the upper yoke member 34 and allow the upper assembly to be lowered, as above-described, while placing tension on the elastic strap member 47. This process can be repeated until the device has been lowerd to the ground.

It will be noted that during the ascent of the device, the non-elastic strap member 41 prevents the top bight member 37 from being elevated relative to the lower bight member 17 in the initial stage of operation, whereby the upward force exerted on the sleeves 50, 50 causes the upper assembly to be pivoted in a clockwise direction as viewed in FIGURE 6, thereby stretching the elastic strap members 44. This tension in the elastic strap members 44 causes the lower assembly to be pivoted in a clockwise direction to release its clamping action on tree trunk 40 as soon as the operator shifts his weight to the upper sleeve members 50, 50, and causes the lower portion of the assembly to pivot in a clockwise direction, as above-mentioned, and as shown in FIGURE 7. The retraction of the strap members 44 automatically elevate the lower portion of the assembly so that the device moves through one climbing step for each cycle of operation.

A canvas seat 60 may be employed with the device, as illustrated in FIGURE 2. The seat 60 comprises a generally rectangular piece of flexible sheet material, such as canvas, or the like, provided with end hems 61, 61, receiving the bight portions of respective U-shaped supporting slings 62, 62 having hooks on the ends of their arms engageable over the side bars 32, 32 of top frame 30. Thus, a person using the device may employ the seat 60 if he is to remain therein for a long period of time, for example, while watching for deer, or other game. Furthermore, the device may be provided with a suitable flexible cover skirt 70 which may be attached in any suitable manner to top frame 30 and the edges of platform 12 to form an enclosure for the user. The skirt member 70 may be provided with suitable pockets 71 for receiving equipment, or other necessary objects. Furthermore, a transparent top enclosure 73 may be provided, comprising an upwardly-convergent hood of transparent flexible plastic material, or the like, having a transparent circular roof 74 and downwardly-flaring transparent sidewalls 75 whose bottom periphery fits over the frame 30. The roof portion 74 is supported on a cruciform frame comprising a longitudinal bar 76 and a crossbar 77. A depending stud 78 is rigidly-secured to the junction of the bars 76 and 77 and extends downwardly and forwardly therefrom, as shown in FIGURE 5, the stud 78 being engageable in the top end of a sleeve-like strut segment 79. The segment 79 has a depending bottom stud 80 engageable in the top end of a sleeve-like strut segment 79. The segment 79 has a depending bottom stud 80 engageable in the top end of a second sleeve-like strut segment 81 whose bottom end receives an upstanding and rearwardly-inclined stud 82 rigidly-secured to the intermediate portion of the transverse frame arm 33. As shown in FIGURE 1, the stud 82 is preferably of square shape and the aperture in the bottom and of the strut sleeve 81 is of corresponding shape so that the sleeve 81 is non-rotatably engaged with the stud 82, whereby the supporting structure for the transparent hood 73 is adequately interlocked with the remainder of the device, when in use. The studs 78 and 80 are also preferably of non-circular shape and their receiving apertures are of similar shape so as to improve the rigidity of the hood-supporting structure.

The skirt member 70 is preferably provided at its upper inner corner portions with suitable pockets to receive upstanding supporting arms detachably-secured to the top frame member 30. Thus, a pair of supporting arms 90, 90 are provided for use at the inner corner portions of top frame 30, said arms 90 having slotted inwardly-directed fastening lugs 91 which are engageable on the upper eye bolts 36, 36 and which are clampingly-secured on said eye bolts by wing nuts 92 provided thereon. At the outer corners of frame 30, arms 94 are provided having depending slotted lugs 95 which are engageable on the threaded rod members 96 associated with the sleeves 50 and which may be locked thereto by clamping nuts 97 provided on said threaded rod members, as shown in FIGURE 1. The supporting rods 90 and 94 may, therefore, be fastened in positions projecting upwardly and outwardly from the corners of frame 30 and may be received in suitable pockets provided therefor in the top hem portion of the skirt member 70.

The skirt member 70 may be of any suitable design, for example, may comprise a sheet design adapted to be wrapped around the climbing device and may be provided at its inner margins with grommets 98 through which fastening cords 99 may be engaged. The cords 99 may be used in any suitable manner to secure the cover to the device.

In mild weather the device may be employed without the top hood 73 and skirt member 70, or may be employed merely with the skirt member 70. In bad weather, both the top hood 73 and the skirt member 70 may be employed, and the interior of the shelter thus defined may be heated in any suitable manner, for example, by means of a small portable heater, or lantern.

While a specific embodiment of an improved device for climbing a tree trunk, or the like, has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device for climbing a tree trunk or the like comprising a rigid platform member having a forward transverse edge engageable with a tree trunk, a yoke secured to the sides of the platform member at points spaced substantial distances rearwardly from said forward edge and being clampingly-engageable around the tree trunk, means rigidly-supporting said yoke at an angle extending upwardly and forwardly from the platform member, whereby the yoke and platform member cooperates to grip the tree trunk therebetween responsive to the weight of a person on the platform member, a rigid frame above the platform member, said frame having a forward transverse arm engageable with the tree trunk, a second yoke secured to the sides of the frame at points spaced substantial distances rearwardly from said forward arm and being clampingly-engageable around the tree trunk responsive to downward force applied to the frame, means rigidly-supporting said second yoke at an angle extending upwardly and forwardly from said frame, flexible non-elastic stop means connecting the forward end portions of the yokes and limiting separation thereof, and means resiliently-connecting the forward end portions of the sides of the frame to the subjacent forward end portions of the sides of the platform member.

2. The climbing device of claim 1, and wherein the means resiliently-connecting the sides of the frame to the sides of the platform member comprise respective elastic strap members.

3. The climbing device of claim 2, and wherein each of said strap members is provided at least at one end with detachable fastening means.

4. The climbing device of claim 3, and additional resilient connecting means, and means for at times connecting said additional resilient connecting means between the rear end portions of the platform member and frame, whereby the device may be employed for descent by disconnecting the side elastic strap members.

5. The climbing device of claim 4, and wherein the forward transverse edge of the platform member is concave in contour.

6. The climbing device of claim 5, and wherein the forward transverse arm of the frame has a bowed configuration similar to and substantially parallel to the contour of the forward transverse edge of the platform member.

7. The climbing device of claim 6, and wherein the yoke members have respective bowed bight portions opposing the concave edge of the platform member and the bowed transverse forward arm of the frame.

8. The climbing device of claim 7, and wherein the means rigidly-supporting the yokes comprises upstanding eye bolts secured respectively to the sides of the platform member and frame adjacent their forward corners, and wherein the yokes have side arms extending through the eye portions of the eye bolts, and means rigidly-connecting the rear ends of the side arms respectively to the rear corner portions of the platform member and frame.

9. The climbing device of claim 7, and a cover skirt member engageable around the frame and platform member, and means to detachably-secure the top margin of said skirt member to said frame.

10. The climbing device of claim 9, and a transparent cover hood engageable over the frame, upstanding support means supportingly-engageable with said hood inside thereof, and means to detachably-mount said upstanding support means on said frame.

References Cited

UNITED STATES PATENTS

| 2,991,842 | 7/1961 | Hardin | 182—187 |
| 3,116,808 | 1/1964 | Riley | 182—187 |
| 3,358,789 | 12/1967 | Laun | 182—187 |

REINALDO P. MACHADO, Primary Examiner

U.S. Cl. X.R.

182—136, 187